United States Patent
Barthel et al.

(10) Patent No.: US 9,677,699 B2
(45) Date of Patent: Jun. 13, 2017

(54) COUPLING

(71) Applicant: TI Automotive (Fuldabrück) GmbH, Fuldabrück (DE)

(72) Inventors: Iris Barthel, Schauenburg (DE); Alexander Bol, Guntershausen (DE); Hans Jensen, Dettingen unter Teck (DE)

(73) Assignee: TI Automotive (Fuldabrück) GmbH, Fuldabrück (DE)

( * ) Notice: Subject to any disclaimer, the term of this patent is extended or adjusted under 35 U.S.C. 154(b) by 411 days.

(21) Appl. No.: 14/258,593

(22) Filed: Apr. 22, 2014

(65) Prior Publication Data

US 2014/0312614 A1    Oct. 23, 2014
US 2016/0215909 A9    Jul. 28, 2016

(30) Foreign Application Priority Data

Apr. 23, 2013  (EP) .................................. 13164946.9

(51) Int. Cl.
*F16L 37/088* (2006.01)
*F16L 37/12* (2006.01)
*F16L 37/14* (2006.01)

(52) U.S. Cl.
CPC .......... *F16L 37/1225* (2013.01); *F16L 37/088* (2013.01); *F16L 37/144* (2013.01); *F16L 2201/10* (2013.01)

(58) Field of Classification Search
CPC .................................................. F16L 37/144
(Continued)

(56) References Cited

U.S. PATENT DOCUMENTS 5,683,117 A    11/1997   Corbett et al.
7,390,025 B2 *  6/2008   Pepe et al. ............ F16L 37/088
                                                    285/305
(Continued)

FOREIGN PATENT DOCUMENTS

EP    0593937 A1    4/1994
EP    1719944 A2    11/2006
(Continued)

OTHER PUBLICATIONS

European Patent Office, European Search Report in European Patent Application No. EP 13 16 4946 (Sep. 12, 2013).

*Primary Examiner* — David E Bochna
(74) *Attorney, Agent, or Firm* — Brinks Gilson & Lione (57) ABSTRACT

A coupling, for a fluid line, having a retainer and a coupling body defining a throughbore extending from an inlet opening at a male member reception end which functionally receives a male member. The retainer has a crossbar, with two spaced retainer legs, and at least one locking arm. The retainer is mounted in a moveable manner to the coupling body in radial direction in relation to the throughbore. In a starting position when the male member is not or not fully inserted into the coupling body, one free end of a retainer leg rests upon a blocking surface on the coupling body blocking the retainer from shifting into a locking position, whereby the crossbar is in the starting position, protruding out of the coupling body. At least one free end of a retainer leg is positioned in a receptacle slot in the coupling body when the male member is functionally received into the coupling body and the retainer is shifted into a locking position, whereby the crossbar is essentially positioned in a crossbar receptacle of the coupling body in order to indicate the mounted state. The locking arm features a locking element, which in the starting position, interacts with a complementary locking (Continued)

element on the coupling body securing the retainer releasably within the coupling body.

15 Claims, 10 Drawing Sheets

(58) Field of Classification Search
USPC .......................................... 285/305, 317, 23
See application file for complete search history.

(56) References Cited

U.S. PATENT DOCUMENTS

| | | | | |
|---|---|---|---|---|
| 7,497,480 B2* | 3/2009 | Kerin et al. | .......... | F16L 37/088 285/305 |
| 7,677,608 B2* | 3/2010 | Takayanagi | ........... | F16L 37/144 285/305 |
| 9,212,773 B2* | 12/2015 | Okazaki | ................ | F16L 37/088 |
| 2003/0052484 A1 | 3/2003 | Rautureau | | |
| 2004/0061330 A1* | 4/2004 | Okada et al. | .......... | F16L 37/144 285/93 |
| 2006/0103134 A1* | 5/2006 | Kerin | .................... | F16L 37/088 285/305 |
| 2006/0267341 A1* | 11/2006 | Takayanagi | ........... | F16L 37/144 285/305 |
| 2007/0273150 A1* | 11/2007 | Tsurumi | ................ | F16L 37/144 285/305 |
| 2008/0111372 A1* | 5/2008 | Trede et al. | .......... | F16L 37/144 285/305 |
| 2009/0167020 A1* | 7/2009 | Blivet et al. | .......... | F16L 37/317 285/317 |
| 2011/0127766 A1* | 6/2011 | Tsurumi | ................ | F16L 37/144 285/305 |
| 2012/0211977 A1* | 8/2012 | Callahan et al. | ..... | F16L 37/144 285/313 |

FOREIGN PATENT DOCUMENTS

| | | | | |
|---|---|---|---|---|
| EP | 1892450 A2 | 2/2008 | | |
| JP | FR 2903164 A1 * | 1/2008 | ........... | F16L 37/144 |
| JP | WO 2008093627 A1 * | 8/2008 | ........... | F16L 37/144 |
| JP | WO 2012043024 A1 * | 4/2012 | ........... | F16L 37/144 |

* cited by examiner

COUPLING

CROSS-REFERENCE TO RELATED APPLICATIONS

This patent application claims priority pursuant to Title 35 USC Section 119 to European Patent Application No. 13 164 946.9, filed Apr. 23, 2013, entitled "Coupling," the entire contents of which are hereby incorporated by reference herein.

BACKGROUND

The invention is concerning a coupling, particularly a coupling for a fluid line, primarily of an automobile with one coupling body and one retainer, whereby the coupling body features one throughbore, which throughbore extends from a male member reception end of the coupling element, whereby the coupling element receives a functional male member in mounted state, which male member extends through the inlet opening of the coupling element into the throughbore, whereby the retainer features a crossbar, on which crossbar are attached two spaced retainer legs, whereby between the retainer legs at least one locking arm is attached to the crossbar, whereby the retainer is mounted in a moveable manner onto the coupling body in radial direction in relation to the throughbore, whereby in a starting position, when the male member is not or not fully inserted into the coupling body, one free end of a retainer leg is resting upon a coupling body side blocking surface blocking the retainer in the coupling body from shifting into a locking position, whereby the crossbar in the starting position is essentially protruding out of the coupling body.

Coupling bodies of the kind previously mentioned are fundamentally known from practical experience. In doing so, it has proven successful to insert a retainer into a coupling body for the securing of a tube. Furthermore, it is known from EP 1 719 944 B1 to combine a retainer with an verification element, whereby the verification element indicates a proper or functional connection between the male member and the coupling body. Such coupling systems have fundamentally proven successful in practical experience.

It is however desirable to simplify the structure of a fluid coupling without having to accept functionality losses.

The invention therefore has the underlying technical problem of specifying a coupling of the kind initially mentioned, which would feature a simple structure, high reliability and a hassle-free mounting method.

SUMMARY OF THE INVENTION

In order to resolve the technical problem, the invention teaches a coupling of the kind initially mentioned, which is featuring at least one free end of a retainer leg being positioned in a coupling body side receiving slot, if the male member is inserted into the coupling body element in a working manner and the retainer relocated into a locking position and if the crossbar in the locking position is essentially positioned for the indicating of the mounted state in a crossbar receptacle of the coupling body, if the locking arm is featuring a locking element, which locking element in the starting position is interacting with a coupling body side, complementary locking element securing the retainer preferentially releasably within the coupling body.

The coupling is a quick connector by way of example. The coupling is primarily usable in a fluid line, which fluid line is positioned in a SCR system, a fuel line system or a break line system. Preferentially, the coupling is particularly being used in a fluid line system for the passing through of SCR system (Selective Catalytic Reduction System) urea solutions.

It is within the scope of the invention that the coupling body element (housing) is molded in one or more pieces.

Depending on the design, the coupling body is being molded by a seal element and a connector element separate from the seal element, whereby it is possible that the seal element and the connector element are preferentially connected with each other in one piece. Upon recommendation the coupling body essentially consists of plastic, such as polyphthalamide (PPA) or metal, such as aluminum. The male member reception end (inlet opening) is expediently positioned within the seal element. Preferentially, an exit opening (discharge outlet) is positioned within the connector element, whereby the throughbore of the inlet opening is extending to the exit opening. The throughbore can feature a straight or angled molding. A longitudinal axis of the throughbore is particularly extending from the inlet opening to the discharge outlet. Preferentially, the connector element is equipped with a connection section that can be used to, for instance, connect a pipeline, a hose or a tank and the likes. Preferentially, there is at least one sealing member positioned within the seal element, which sealing member in mounted state is impermeably by fluid resting upon the male member.

Preferentially, the male member is particularly the end of an expediently rigid pipe, which pipe is featuring an advantageously circular cross section. It is recommended that there be a radially enlarged upset positioned on the pipe, which upset is featuring a larger cross section than the preferential rigid pipe. The upset within the scope of the invention is equipped with a radial impact surface and an essentially axial peripheral area. An free end of the male member can be inserted, preferentially in the direction of the insertion, through the inlet opening into the coupling body. Axial is particularly referring to an orientation parallel or approximately parallel to the longitudinal axis of the throughbore, respectively, whereas radial, within the scope of the invention, is referring to crosswise or approximately crosswise to the longitudinal axis of the throughbore, respectively.

Preferentially, the retainer is particularly a retainer of the horseshoe type. According to a particular preferential design, the retainer is molded as one piece or as one component, respectively. A retainer leg of the retainer is equipped with an elastic spring section and a retaining section, whereby preferentially only the spring section is allowing for a reversible deformation of the retainer leg. The retainer legs, starting at the crossbar, are protruding further into the coupling body than the locking arm(s). It is within the scope of the invention that the crossbar (crossbar) of the retainer is featuring an outline on the side facing away from the throughbore that is essentially corresponding with the outline of the coupling body. The length of the crossbar is preferentially larger than the distance between the retainer legs, whereby the retainer legs are positioned according to a design spaced from the ends of the crossbar.

The crossbar in the starting position is essentially protruding out of the coupling body particularly means that the crossbar is fully positioned or essentially fully positioned outside of the coupling body or that only one part of the crossbar in the starting position is positioned in the crossbar receptacle. By pressing the crossbar in the direction and orientation of the throughbore or by radially pressing in relation to the throughbore of the crossbar the retainer becomes transferable into the locking position from a visible position or starting position, respectively, when the male member is functionally received into the coupling body. The male member being functionally received into the coupling body primarily means that a section of the preferential rigid pipe of the male member is being received impermeably by fluid into the coupling body particularly into the seal element of the coupling body and that the upset of the male member is being rear engaged by the retainer legs of the retainer. This state is primarily being referred to as the mounted state. Preferentially, the retainer in the mounted state is positioned particularly between the inlet opening of the coupling body and the upset of the male member. In mounted state the retainer is to be in the locking position, whereby in the locking position the crossbar is essentially positioned in the crossbar receptacle. Preferentially, the retainer in the locking position is to be in a pushed-in position. The crossbar in the locking position essentially being positioned in the crossbar receptacle preferentially means that the crossbar has mostly and preferentially fully been received into the crossbar receptacle. It is recommended that a part of the crossbar, which part of the crossbar being positioned in the locking position in the crossbar receptacle, is larger than a part of the crossbar, which part of the crossbar can be in the starting position in the crossbar receptacle.

Advantageously, each retainer leg is featuring one free end, which free ends in their starting position each come into contact with a coupling body side blocking surface. Preferentially, the free ends of the retainer legs are not connected to each other. Expediently, the spring section of the retainer leg is connected to the crossbar, whereby the retaining section is being made to conform to the spring section. The free end of one retainer leg is positioned within the scope of the invention on the end of the retainer section facing away from the spring section. The coupling body is equipped with a blocking protrusion, on which blocking protrusion two blocking surfaces are positioned, whereby one blocking surface is assigned to each retainer leg or each free end of a retainer leg, respectively. The blocking protrusion is diametrically positioned in relation to the throughbore across from the crossbar receptacle within the coupling body. It is within the scope of the invention that the length of a retainer leg from the crossbar to the free end is larger than the diameter of the throughbore. In the starting position the retainer legs are each coming into contact with a blocking surface in such a way that the retainer legs are preferentially flanking the throughbore and the retainer sections of the retainer legs are each protruding into the throughbore in sections. The distance between the sections of the retainer legs protruding into the throughbore in the starting position is preferentially smaller than the diameter of the male member upset.

Advantageously, the coupling body side receiving slots are sized in a way that the receiving slots are preventing or essentially preventing a radial shifting of the retainer legs in the locking position in relation to the throughbore. Expediently, cross sections of the receiving slots are slightly larger than cross sections of the free ends of the retainer legs where applicable, in order to particularly allow a smooth insertion of the free ends into each receiving slot assigned to one free end. By pressurizing the fluid system in the mounted state of the coupling the male member is being pressurized in the direction of the inlet opening or contrary to the direction of insertion, respectively. Since the free ends in the locking position of the retainer are advantageously positioned within the receiving slots, a radial expansion of the retainer legs can be ruled out, particularly when the upset is being pushed against the retainer. In the locking position is the distance between the retainer legs or between the retainer sections of the retainer legs positioned within the throughbore, respectively is smaller than the diameter of the upset.

Expediently, there is at least one protrusion with a parallel or approximately parallel to the direction and orientation of insertion of the male member, protrusion surface at the side positioned on an inlet opening side surface of a retainer leg and/or locking arm, preferentially on each retainer leg and/or each locking arm, which protrusion surface at the side in the locking position is coming into contact with one or more coupling body side, complementary protrusion surfaces. In particular, the protrusion surfaces and/or complementary protrusion surfaces are preferentially curve shaped, whereby the protrusion surfaces of the retainer legs and/or the locking arms are located on a circular path. By pressurizing the fluid system or a flow passage of the coupling molded by the throughbore, the male member and the upset of the male member are preferentially pressed against the retainer, so that the retainer is preferentially pressed in axial direction and counter the direction of insertion of the male member against the coupling body. As a result of pressurizing the retainer, the inlet opening side surface (frontal area) of the retainer legs and/or locking arms are pressed against a surface of the coupling body facing away from the inlet opening, so that the retainer side protrusion surface(s) preferentially come into interlocking contact with the complementary, coupling body side protrusion surfaces. This way a shifting of the retainer from the locking position in the direction of the starting position is being prevented in the mounted state, particularly when there is pressure (operating pressure) due to operating conditions in an interior of the coupling body or in the throughbore of the coupling body, respectively, which operating pressure is preferentially higher than the pressure of the atmosphere surrounding the coupling. Advantageously, the retainer side protrusion surface is removable from the coupling body side, complementary protrusion surface, when the retainer is pushed away in axial direction or in the direction of insertion of the male member of the inlet opening, respectively. An axial displacement path of the retainer parallel to the direction of insertion (axial direction) is approximately as long as the axial extent of the protrusion surface. Axial extent is particularly referring to an extent of the retainer side, contact surfaces at the side in the direction of insertion.

It is within the scope of the invention that the retainer legs are each featuring a conical insertion area on the frontal area facing the inlet opening. Expediently, the insertion areas are extending radially inward and are inclined in axial direction in the direction of the discharge outlet. Radially inward is primarily referring to the direction of the longitudinal axis of the throughbore. An impact of the insertion areas with the upset of the male member preferentially causes an expansion of the retainer legs and a shifting of the retainer in radial direction from the starting position into a release position, whereby it is recommended that during the shifting the crossbar of the retainer is shifted away from the retainer out of the starting position into the release position of the coupling body in radial direction. In the release position a distance between the retainer sections of the retainer legs protruding into the throughbore is at least as large as the diameter of the upset of the male member. In the release position the retainer legs are featuring a maximum distance from each other in the area of the throughbore, whereby for the transfer of the retainer legs out of the starting position into the release position preferentially only the spring section is stretched and/or elastically deflected. In the release position the retainer legs are preferentially pressed in the direction of the longitudinal axis of the throughbore through the spring sections, whereby the spring sections in the starting position of the retainer legs are preferentially decompressed or tension-free.

It is within the scope of the invention that through an impact of the insertion areas of the retainer legs with the upset of the male member, the retainer is shifted in axial direction in the direction of the exit opening, so that preferentially, the retainer side protrusion surfaces can be released from the coupling body side, complementary protrusion surfaces. An impact of the insertion areas with the upset advantageously causes the retainer to be pushed out from the coupling body in radial direction with the crossbar beginning at the starting position. In the release position, it is recommended that the crossbar is lifted out of the crossbar receptacle as far as possible, whereby the locking arm(s) is/are ruling out a removal of the retainer from the coupling body.

According to one design, the retainer legs are each featuring at least one rear (discharge outlet side) locking section, which locking sections in the locking position come into contact with the upset of the male member. The locking sections are preferentially each equipped with a recess, whereby in the recess, a contact area that is positioned crossways to the direction of insertion, preferentially in the mounted state or locking position of the retainer, expediently comes into contact with the impact surface of the male member. It is recommended that the locking sections are each preferentially featuring arched lateral surfaces with an orientation parallel to the direction of insertion, limiting the contact area, which lateral surfaces in the locking position expediently come into contact with the circumferential surface of the upset.

It is possible that the retainer legs are each featuring a first and second locking section, whereby the locking sections are each featuring a contact area with a crossways orientation to the direction of insertion of the male member and a lateral surface with a parallel or essentially parallel orientation to the direction of insertion. Expediently, the second locking sections are preferentially positioned between the first locking section and the free end of the retainer legs, preferentially the retainer sections, respectively. According to one design, the preferentially arched lateral surfaces of the first locking sections are each located on a first circular path, which first circular paths are different from second circular paths molded by the preferential arched lateral surfaces of the respective second locking sections. In particular, the radius of the preferentially arched lateral surfaces of the first and second locking sections is approximately correlating to the radius of the upset of the male member. Expediently, the retainer, particularly by means of the spring sections of the retainer legs, can be shifted from the locking position in radial direction in relation to the throughbore into the coupling body, when the upset of the male member has passed the retainer legs of the retainer in the direction of insertion and come into contact with the discharge outlet side of the retainer or a side of the retainer facing away from the inlet opening.

According to one design, the retainer legs are each springing in the direction of the longitudinal axis of the throughbore, when the male member is resting upon the discharge outlet side of the retainer and the retainer through the elasticity impact of the spring sections is springing in radial direction from the release position into a temporary locking position. In the temporary locking position, each of the first locking sections of the retainer legs come into contact with the upset of the male member. By pressing the crossbar or the retainer in the direction of the longitudinal axis of the throughbore, the retainer can be shifted into the coupling body, beginning at the temporary locking position and going into the locking position in radial direction, whereby in the locking position each of the second locking sections of the retainer legs are resting upon the upset of the male member. A shifting of the retainer from the release position into the temporary locking position and the locking position is only possible within the scope of the invention, if the male member has been fully or functionally inserted into the coupling body.

When according to a design, the male member is only inserted into the coupling body in a way that the upset free section of the pipe is positioned between the retainer legs of the retainer, an expansion of the retainer legs is avoided, so that the free ends of the retainer legs are not released from the blocking surfaces and the retainer cannot be shifted into the locking position. When for instance the upset is positioned between the retainer legs, the retainer legs will be expanded and the retainer will be pressed from the starting position into the release position. A shifting of the retainer from the release position into the locking position is then being prevented by causing the locking arm(s) to rest upon the upset before reaching the temporary locking position.

In particular, the retainer can only be shifted from the starting position into the locking position by an impact force of the crossbar directed towards the throughbore, when the retainer is moved or lifted into the release position through the expansion of the retainer legs by means of the upset of the male member. Through the shifting of the retainer from the starting position into the release position, preferential the free ends of each retainer are preferentially lifted off from the blocking surfaces. The lifting of the retainer from the starting position into the release position indicates expediently that when inserting the male member into the coupling body, the upset is positioned at least between the retainer legs of the retainer.

In particular, the retainer legs are each preferentially featuring an expansion surface, which expansion surfaces in the starting position of the retainer come into contact with coupling body side, complementary expansion surfaces, whereby the complementary expansion surfaces beginning at throughbore side ends are divergently positioned towards ends facing away from the throughbore. The coupling body side, complementary expansion surfaces are preferentially attached to a coupling body side expansion element, which expansion element is for instance featuring a trapezoid-shaped cross section. On the throughbore side end of the expansion element the distance of the coupling body side, complementary expansion surfaces is smaller than the distance of the complementary expansion surfaces on the end of the expansion elements facing away from the throughbore.

According to one design the expansion surfaces are sliding along the coupling body side, complementary expansion surfaces when the retainer is shifting from the locking position and/or starting position into the release position, so that an expansion force can be applied to the retainer legs, whereby the retainer legs are forced apart. In the release position the upset of the male member can be shifted through the retainer legs in the direction of the inlet opening. Through the expansion of the retainer legs elastic energy is stored particularly in the spring sections of the retainer legs, whereby advantageously, the retainer can be conditionally shifted from the release position into the locking position and/or starting position through the elastic energy stored in the spring sections. Advantageously, a shifting of the retainer from the locking position and/or the starting position into the release position is only possible if, for instance, through manual operation the crossbar or the retainer is pulled out of the coupling body.

It is recommended that two locking arms are attached to the crossbar, which locking arms are spaced from each other and are each positioned between the retainer legs, whereby a locking element is connected to each locking arm. Preferentially, the coupling body is featuring a guide element that engages a gap positioned in between the locking arms gap, when the retainer is reversibly shifted back and forth between the starting position, release position and locking position in radial direction in relation to the throughbore. By means of the guide element, a precise guidance of the retainer is ensured, in order to, for instance, rule out a jamming or tilting of the retainer in the coupling body.

According to one preferential design, each locking arm is featuring one head section on the end protruding away from the crossbar, which head section is carrying the locking element featuring a contact section. Advantageously, the locking element in the release position of the retainer is resting upon the coupling body side, complementary locking element, whereby the contact section in the locking position is resting upon the upset securing the male member redundantly to the retainer legs in the throughbore. In particular, the complementary locking element is preferentially molded as a coupling body side blocking surface. The locking element, for instance, is molded as a protrusion, which protrusion in the release position is resting upon the complementary locking element molded as a blocking surface. When during the insertion of the male member, the upset of the male member is located in the direction of insertion in the coupling body between the retainer legs, when radially pressuring the crossbar in the direction of the throughbore, the contact sections of the locking arms are brought into contact with the circumferential surface of the upset, so that a shifting of the retainer from the release position into the locking position is being prevented. In the locking position the contact section(s) of the locking arm(s) are resting upon the pipe and/or the impact surface of the male member upset.

Preferentially, an axial extent of the locking arm(s) is smaller than an axial extent of the retainer legs. Preferentially, the axial extent of the locking arm(s) is essentially correlating to the axial extent of the retainer legs minus the axial extent of the lateral surfaces of the retainer leg side locking section and/or minus the axial extent of the protrusion surfaces. In particular, an exit opening side front side of the locking arm(s) is preferentially aligned with the contact area of the first and/or second locking section with a crossways orientation to the direction of insertion of the male member.

It is recommended that at least one locking element is positioned on at least one locking arm, with which locking element the retainer is lockable in the locking position and/or the starting or release position with the coupling body. The locking element is, for instance, molded as a spherical segment or half of a sphere. It is recommended that there be allowed one locking element each on both locking arms. The locking elements are within the scope of the invention particularly positioned on the exteriors of the locking arms, which exteriors are pointing away from the gap positioned between the locking arms. Expediently, the locking element(s) is/are resting in the starting position of the retainer on the surface of the expansion elements facing away from the throughbore. It is within the scope of the invention that in the locking position of the retainer the locking element(s) of the locking arm(s) is/are positioned throughbore side in the expansion element and/or throughbore side resting upon the blocking surface. In addition, the locking element(s) are indicating, whether the retainer is in the starting position or locking position.

Preferentially, the crossbar features at least one manipulation element, where by applying force onto the manipulation element a shifting of the retainer from the locking position into the release position and/or from the release position into the locking position is caused. The manipulation element can be a handle, which handle can be grasped by operating staff, for instance. It is fundamentally possible that the manipulation element is molded as a handling area for a tool.

In particular, the male member with the retainer in the locking position is preferentially only secured in the coupling body, whereby the retainer is a verification element for the functional reception of the male member into the coupling body. According to an advantageous design, the retainer legs of the retainer are preferentially each resting upon the male member without interpositioning additional components.

The invention is based on the knowledge that regarding the coupling with the retainer according to the invention, a male member is reliably securable within the coupling body. Advantageously, the retainer, in addition to securing the male member is also serving as a verification element, in order to indicate a functional or proper positioning of the male member within the coupling body. Since the retainer, in addition to the retaining function, is also assuming the function of a verification element, the coupling, according to the invention, is getting by with few components, which is why the coupling, according to the invention, is featuring a surprisingly simple design. The simple structure of the coupling body and of the retainer also facilitates a one handed assembly of the coupling or of the insertion of a male member into the coupling, especially since the retainer is conditionally fixed detachable in the coupling body by the locking elements positioned on the locking arms. Regardless of whether the male member is positioned within the coupling body or not, it can be ruled out that the retainer is being pulled out of the coupling body because of an operating error, for instance. Within the scope of the invention, the retainer is indicating the mounted state or the functional reception of the male member within the coupling body, respectively and is securing the male member in mounted state in a multi-redundant way within the coupling body. Even the malfunction of a retainer leg and/or retainer arm is not compromising the functionally reliable reception of the male member within the coupling body.

DESCRIPTION OF THE DRAWINGS

Following, the invention is being additionally explained based on a drawing that is merely illustrating a design example, in which:

FIG. 4g is an internal view of the coupling body according to the invention and FIG. 4f.

DETAILED DESCRIPTION OF ILLUSTRATED EMBODIMENT

Figure 1:
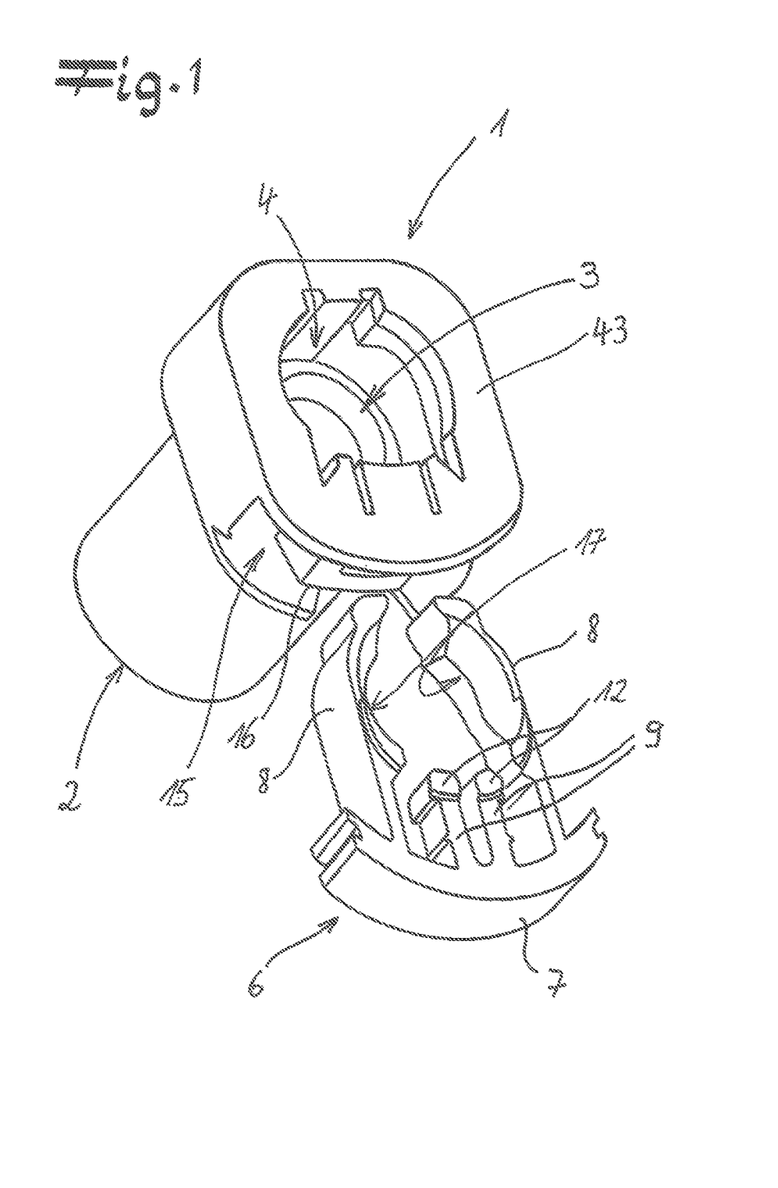
FIG. 1 is a perspective view of a coupling according to the invention.

FIG. 1 illustrates a coupling 1 with a coupling body 2. Preferentially and according to the design example, the coupling 1 is being used in a SCR line system, which has not been illustrated within the given figures. The coupling body 2 is featuring a throughbore 3, respectively. According to FIG. 1, the throughbore 3 extends beginning at an inlet opening (male member reception end) 4 in the coupling body 2. According to FIGS. 2a and 2b, a male member 5 is receivable into the coupling body 2, which male member 5 with a retainer 6 is fixable within the coupling body 2.

Figure 2A:
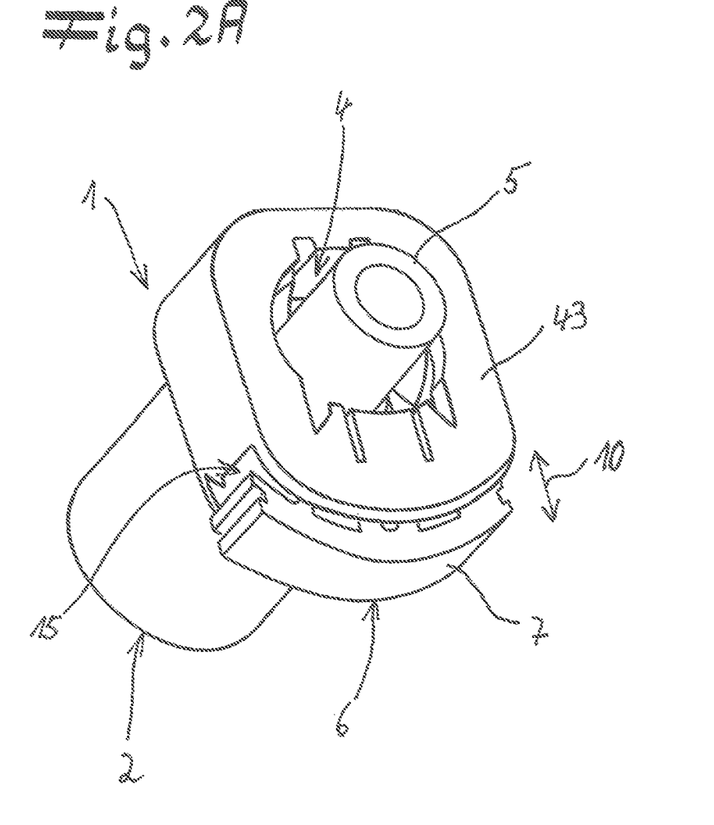
FIG. 2a a perspective view of a coupling according to the invention with a male member inserted and the retainer in a temporary locking position.
Figure 2B:
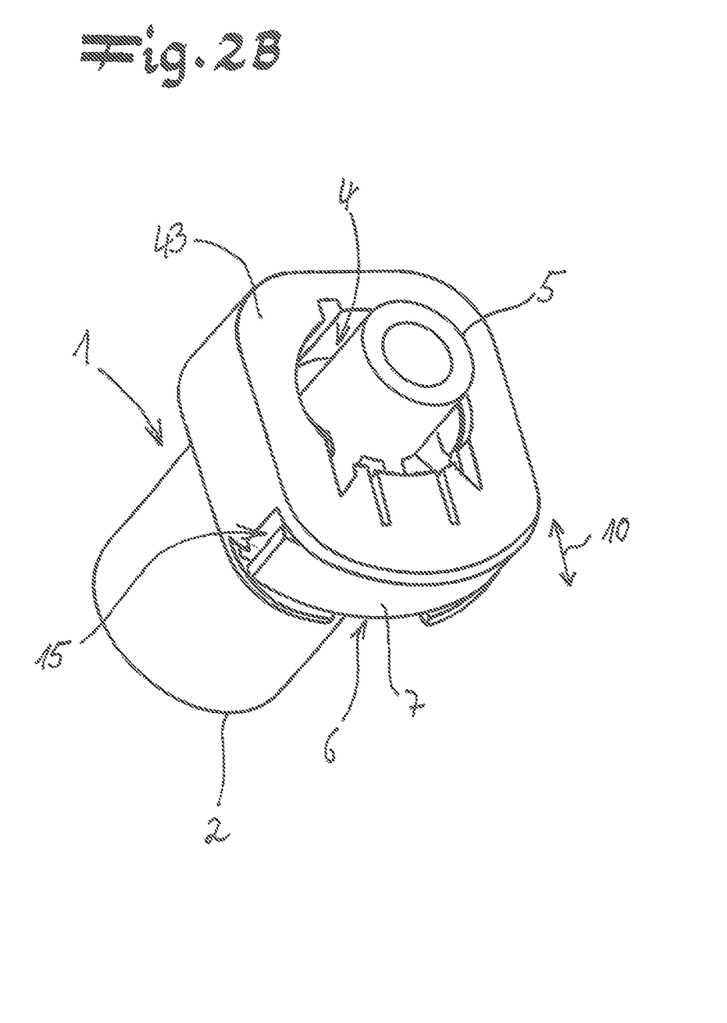
FIG. 2b is a perspective view of the coupling body according to the invention with male member inserted, whereby the retainer is in the locking position.

FIG. 1 illustrates the retainer 6 featuring a crossbar 7, to which crossbar 7 are attached two retainer legs 8 and two locking arms 9, whereby the locking arms 9 are spaced from one another and molded between the retainer legs 8 onto the crossbar 7. In FIGS. 2a and 2b the double arrow 10 is symbolizing that retainer 6 is mounted or guided in a moveable manner in radial direction in relation to the throughbore 3 within the coupling body 2. The crossbar 7 in FIG. 2a is essentially positioned on the exterior of the coupling body 2, whereby it is indicated according to the design example that the male member 5 is not being fixed by retainer 6 within the coupling body 2. In FIG. 2b the retainer 6 is in the locking position, whereby in the locking position the crossbar 7 is essentially received into a crossbar receptacle 15 of the coupling body 2, whereby a functional reception of the male member 5 is indicated within the coupling body 2.

Figure 3A:
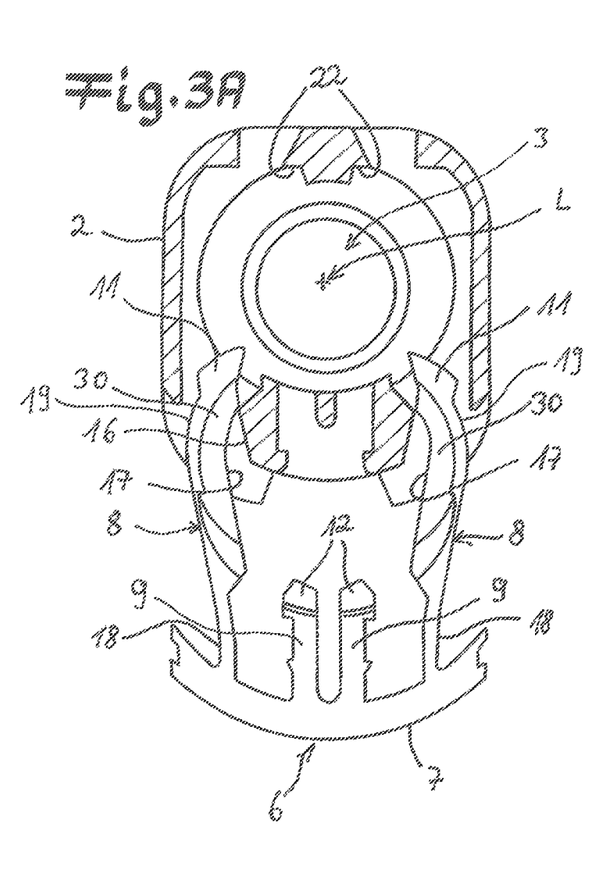
FIG. 3a is a top view onto the coupling body of the coupling according to the invention during the mounting of the retainer, whereby for the sake of a better overview, an intake opening side of the coupling body has been left out.
Figure 3B:
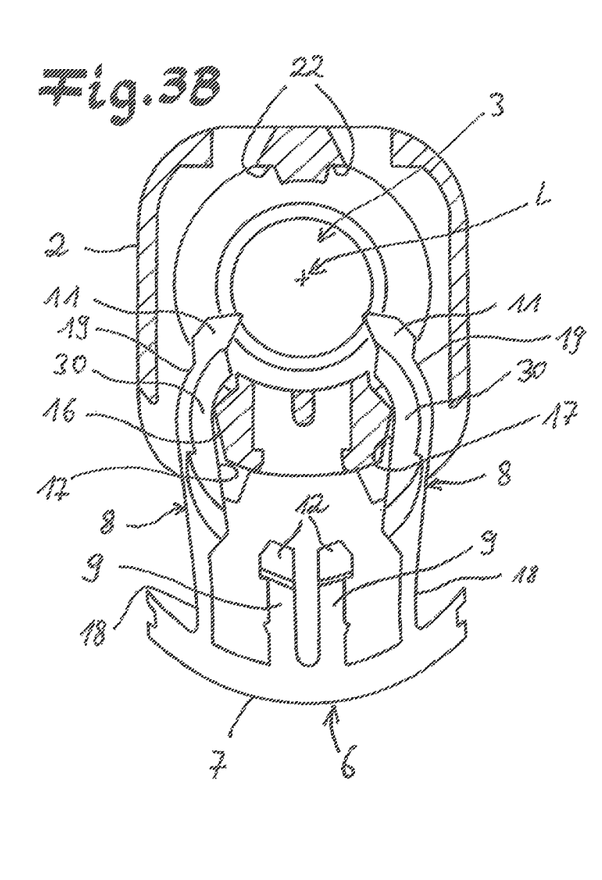
FIG. 3b is a top view of the coupling body according to FIG. 3a, whereby retainer legs of the retainer are inserted into the coupling body.

FIG. 3a contains an illustration depicting a first step to insert the retainer 6 into the coupling body 2. By widening or expanding the retainer legs 8 of the retainer 6, each of the retainer legs 8 are being moved by a coupling body side expansion element 16. Since interior surfaces 17 aligned towards the expansion element 16 of the retainer legs 8 are curved, the insertion state of the retainer into the coupling body 2 as illustrated in FIG. 3b is guaranteeing that the retainer 6 is not falling out of the coupling body 2. Furthermore, FIG. 3b is illustrating that the retainer legs 8 are each featuring a spring section 18 and a retaining section 19, whereby the expansion of the retainer legs 8 by the expansion element 16 is merely causing a flexing and deformation of the spring sections 18 of the retainer 6.

Figure 3C:
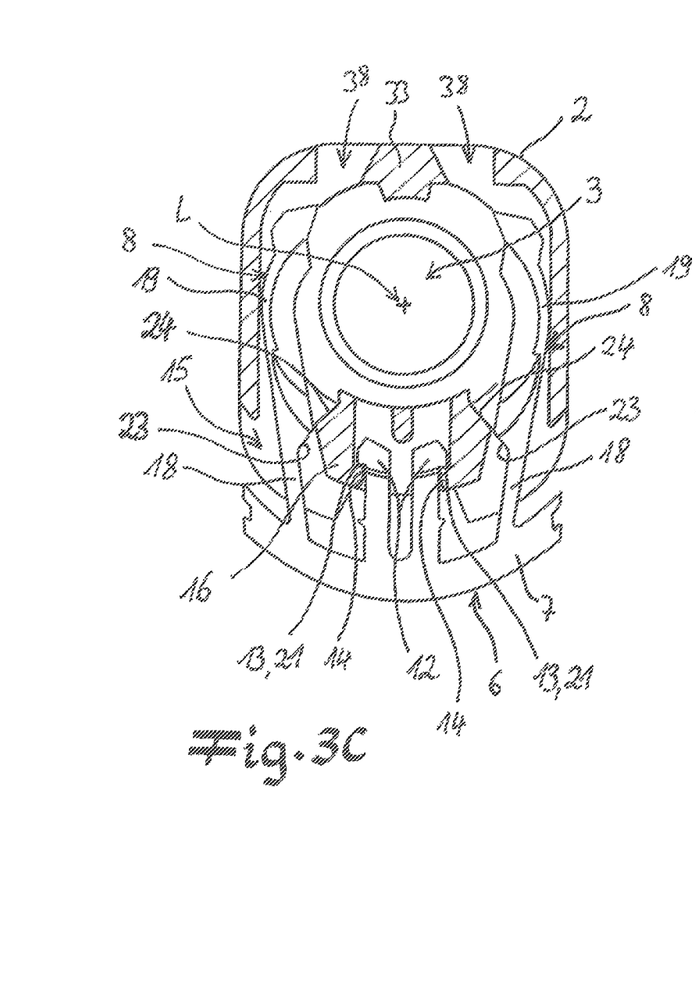
FIG. 3c is a top view of the coupling body according to FIG. 3a with the retainer in the release position.

FIG. 3c is illustrates each head section 12 of the locking arms 9 featuring a locking element molded as a protrusion 13, which protrusions 13 are each rear engaging as complementary locking elements 14 molded as coupling body side locking protrusions 21. This way, the retainer 6 in the coupling body 2 is being secured against an unintentional removal. Preferentially and according to the design example, the retainer 6 is releasable from the coupling body 2 by pressing together the locking arms 9, whereby in this manner, the protrusions 13 positioned on the head sections 12 are detachable from the locking protrusions 21.

Figure 3D:
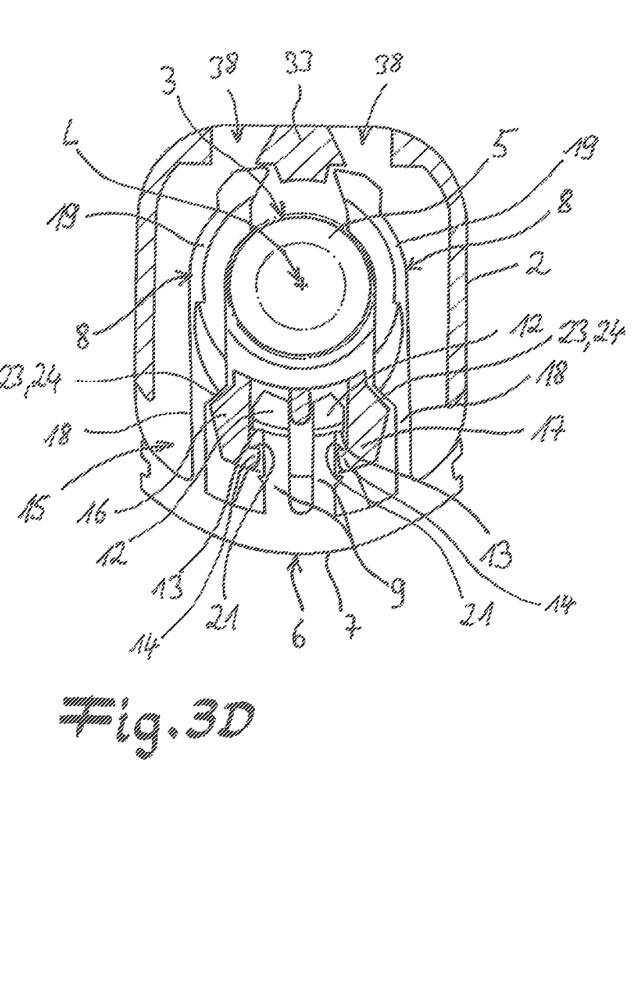
FIG. 3d is a top view of the coupling body according to FIG. 3a, whereby the retainer is in the starting position.

FIG. 3d illustrates the coupling body 2 with the retainer 6 in a starting position, in which starting position the crossbar 7 is essentially positioned on the exterior of the crossbar receptacle 15 of the coupling body 2. Free ends 11 of the retainer legs 8 in the starting position according to FIG. 3d are resting upon coupling body side blocking surfaces 22, whereby a radial shifting of the retainer 6 in the direction of a longitudinal axis L of the throughbore 3 into the coupling body 2 can be ruled out. In addition, FIG. 3d is illustrating an expansion surface 23 positioned on each retainer leg 8, which expansion surfaces 23 in the starting position of the retainer 6 are resting upon coupling body side complementary expansion surfaces 24. The complementary expansion surfaces 24 are molded onto the expansion element 16 and are diverging, beginning at a throughbore side end and going towards a crossbar side end. FIG. 3d is featuring a dotdashed illustration of the male member 5.

Figure 4A:
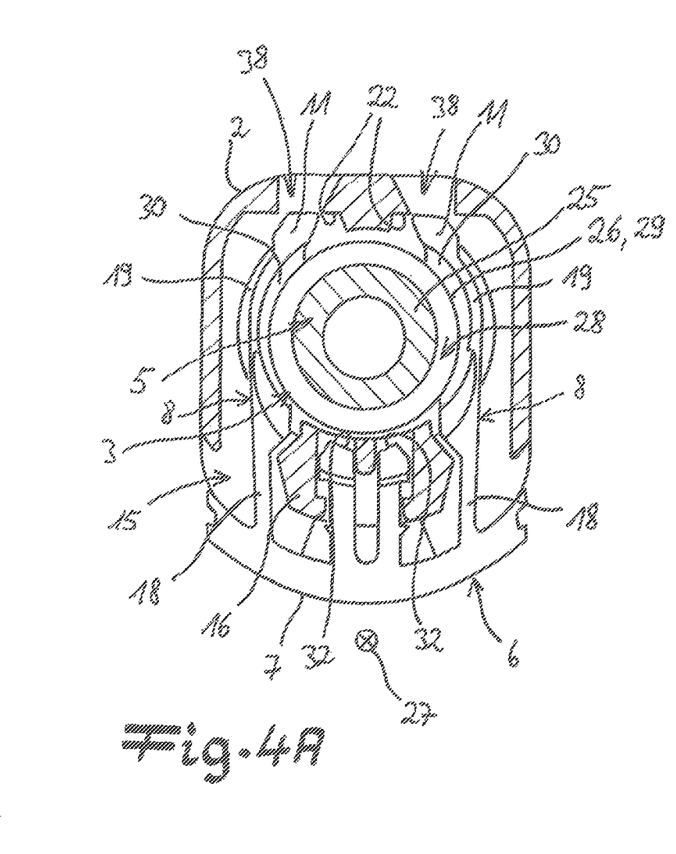
FIG. 4a is a top view onto the coupling body according to FIG. 3a, whereby the male member is partially inserted into the coupling body.
Figure 4B:
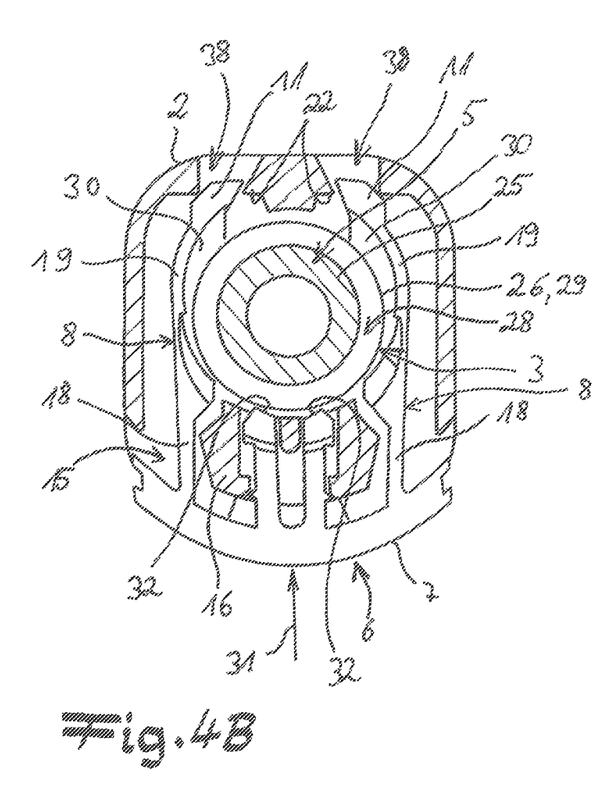
FIG. 4b is a top view of the coupling body according to FIG. 3a, whereby the upset of the male member is positioned between the retainer legs of the retainer.

FIG. 4a identifies the male member 5 featuring a tube 25 with a radial upset 26, whereby the diameter of the radial upset 26 is larger than the diameter or cross section of the tube 25, respectively. In transverse orientation to the direction of insertion identified by the arrow 27, an impact surface 28 of the upset 26 is spread out. In axial direction or parallel to the direction of insertion 27, respectively, the upset is featuring 26 a peripheral area 29. According to the design example and as illustrated in FIG. 4a, the upset 26 is meeting with conical insertion areas 30 of the retainer 6, whereby the retainer legs 8 of the retainer 6 are expanded. According to the design example, the expansion is occurring primarily because the spring sections 18 of the retainer legs 8 are being stretched. Because of the expansion of the retainer legs 8 the free ends 11 of the retainer legs 8 are being released from the blocking surfaces 22. This is illustrated in FIG. 4b. The radial upset 26 in FIG. 4b is positioned between the expanded retainer legs 8, whereby the interior surfaces 17 of the retainer legs 8 are resting upon the upset 26.

FIG. 4b shows that an impact force on the crossbar 7 in direction of the throughbore 3 causes contact surfaces 32 of the locking arm side, head sections 12 to rest upon the upset 26 of the male member 5, so that the crossbar 7 cannot be shifted into the crossbar receptacle 15 of the coupling body 2 by an impact force represented by the arrow 31. According to FIG. 4b, the male member 5 is not fully or not functionally inserted into the coupling body 2.

Figure 4C:
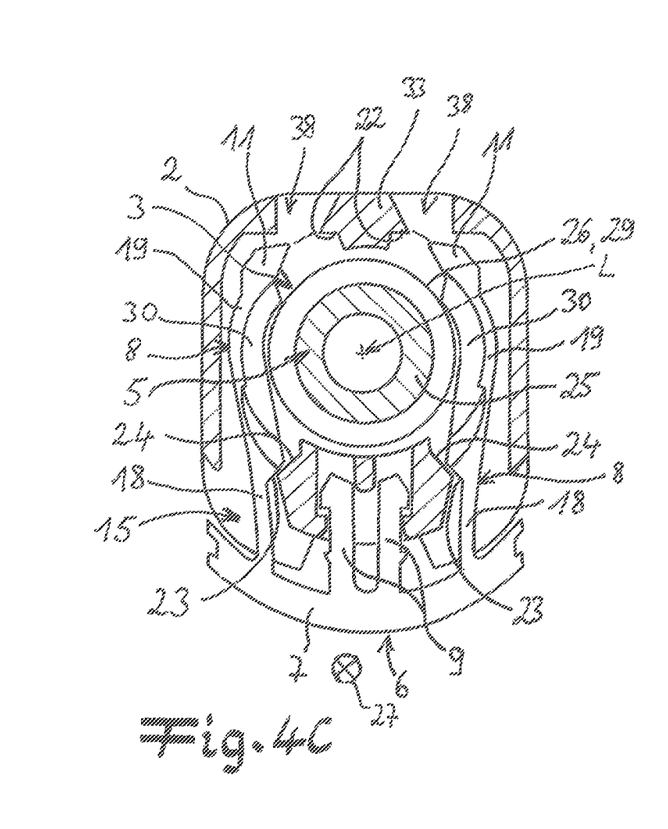
FIG. 4c is a top view onto the coupling body according to FIG. 3a with male member inserted and retainer in the release position.

In FIG. 4c the retainer 6 is in the release position. The upset 26 of the male member 5 is impacting the insertion areas 30 of the retainer legs 8 in such a way that the retainer legs 8 are expanded. Due to the resting of the retainer leg side expansion surfaces 23 upon the complementary expansion surfaces 24, an additional radial shifting of the retainer 6 away from the throughbore 3 of the coupling body 2 is brought about. Subsequently, the crossbar 7 illustrated in release position in FIG. 4c is in a position lifted off as far as possible and is, according to the design example, preferentially placed well in view of the beholder. Furthermore, FIG. 4c identifies that the retainer sections 19 of the retainer legs 8 in the area of the throughbore 3 are featuring so much of a distinct distance from one another that the distance between the retainer legs 8 is at least as large as the diameter of the upset 26 of the male member 5.

Figure 4D:
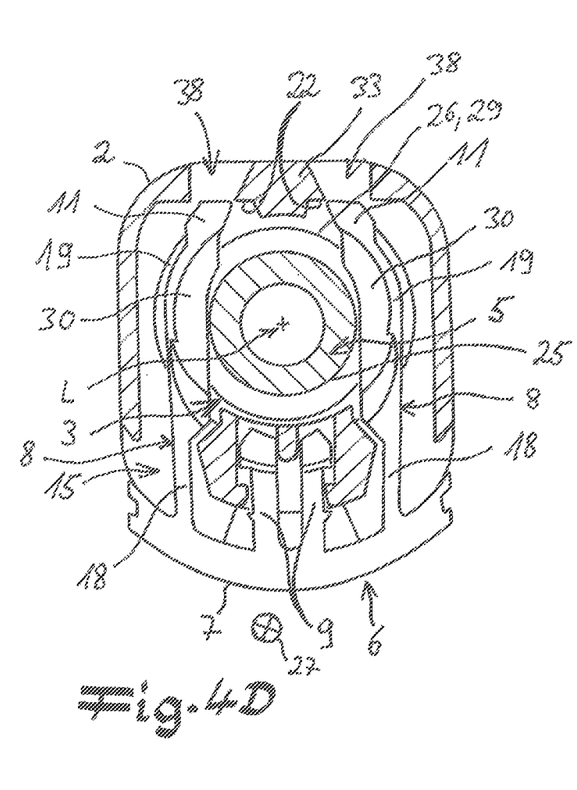
FIG. 4d is a top view of the coupling body according to FIG. 3a, into which the male member is fully inserted and the retainer is in the temporary locking position.

FIG. 4d illustrates that the retainer 6 shifting from the release position into a temporary locking position according to FIG. 4c, whereby the retainer 6 is radially moved in the direction of the coupling body 2 or in the direction of the longitudinal axis L of the throughbore 3 beginning at the locking position. Due to the upset 26 of the male member 5, the retainer legs 8 of the retainer 6 are exposed to an expansion measured in such a way that a distance between the free ends 11 of the retainer legs 8 is as large as a width of a coupling body side blocking element 33, on which blocking element 33 the blocking surfaces 22 are positioned.

Figure 4E:
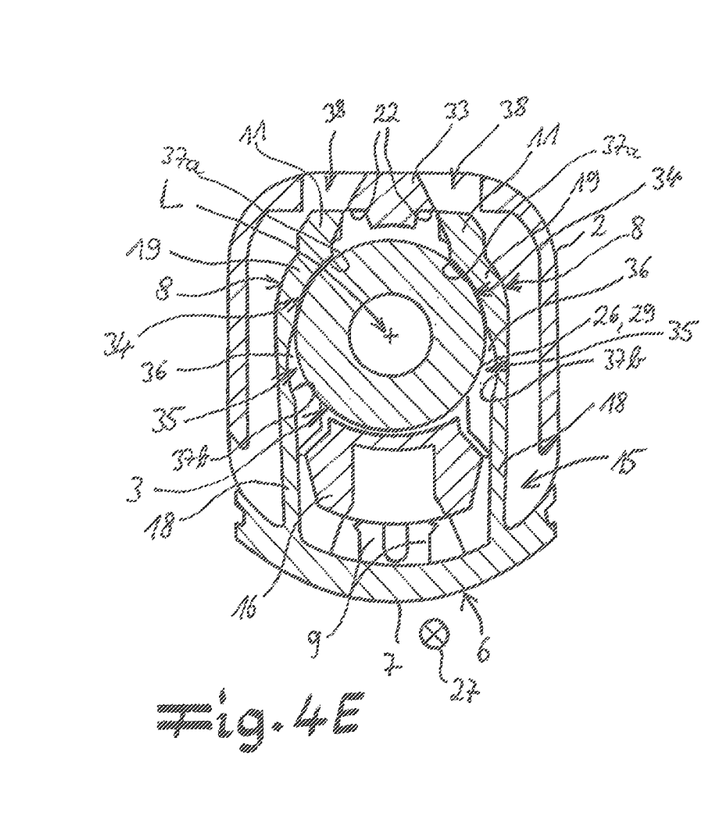
FIG. 4e is a view of the coupling body according to FIG. 4d.
Figure 4F:
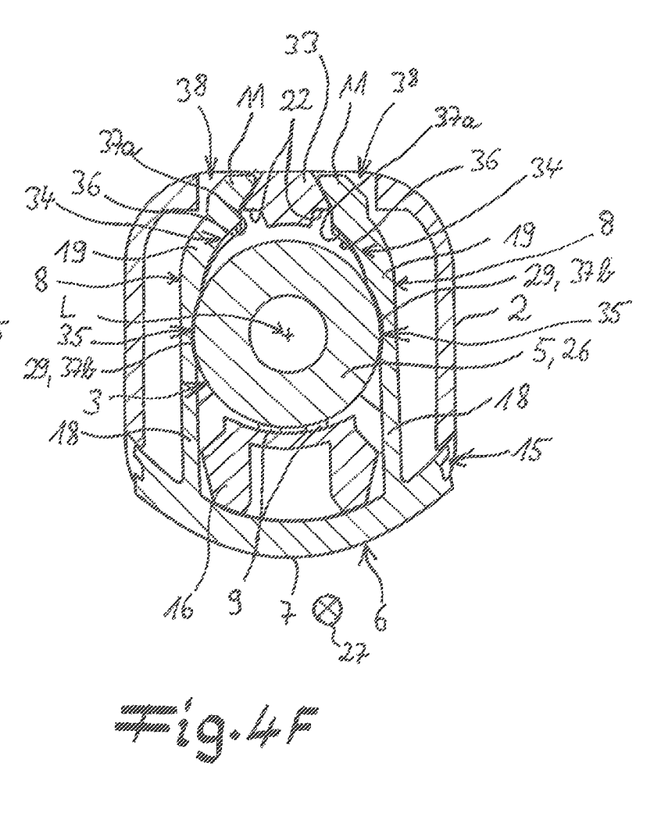
FIG. 4f is a top view of the coupling body according to the invention with the male member in mounted state and the retainer in the locking position.

According to FIGS. 4e and 4f, the internal view identifies that in an area of the retainer legs 8 facing away from the insertion area 30, there are positioned two locking sections 34, 35, respectively. Each locking section 34, 35 is featuring a contact area 36 in transverse orientation to the direction of insertion 27 and lateral surfaces 37a, 37b parallel to the direction of insertion. It can be identified that the lateral surfaces 37a of the first locking sections 34 are each located on a first circular path, which first circular path is different from a second circular path molded by lateral surfaces 37b of the respective second locking sections 35. In the temporary locking position, according to FIG. 4e, the lateral surfaces 37a of the first locking sections 34 and the contact areas 36 are resting upon the upset 26 of the male member 5.

According to FIG. 4f, the male member 5 is functionally received into the coupling body. The impact surface 28 of the upset 26 is resting upon the contact area 36 of the second locking section 35, while the peripheral area 29 of the upset 26 is resting upon the lateral surfaces 37b of the second locking sections 35. Preferentially and according to the design example, the retainer legs 8 are pressed inward or in the direction of the longitudinal axis L of the throughbore 3 by the spring sections 18 in radial direction in relation to the throughbore 3, when the retainer 6 is being shifted from the temporary locking position illustrated in FIG. 4d into the locking position illustrated in FIG. 4f. When the retainer 6 is shifted from the temporary locking position into the locking position, the upset 26 of the first locking section 34 is transferred to the second locking section 35, whereby during the transfer of the upset 26 from the first locking section 34 to the second locking section 35, the retainer legs 8 are pressed together by the spring sections 18. The decrease in distance between the retainer legs 8 thereby causes each free end 11 of the retainer legs 8 in the locking position of the retainer 6 to be inserted into a coupling body side receptacle slot 38 according to FIG. 4f. This is also illustrated in the top view according to FIG. 4g. Furthermore, FIG. 4g identifies that the contact sections 32 of the locking arms 9 are resting upon the tube 25 and the upset 26 of the male member 5.

When the retainer 6 is shifted from the release position into the locking position, locking elements of the locking arms 9 are furthermore brought to rest upon the expansion element 16 as retaining lugs 20, so that while the width of the gap 39 positioned between the locking arms 9 is decreased, the locking arms 9 are pressed together springing apart again when the temporary locking position has been reached. This way, the retainer 6, in addition to the retaining lugs 20 in the locking position, is being secured onto the coupling body 2 or behind the lug protrusions 21, respectively.

FIGS. 4f and 4g particularly illustrate that the crossbar 7 in the locking position of the retainer 6 is fully received into the crossbar receptacle 15 of the coupling body. Thereby it is indicated that the male member 5 is fully and functionally received into the coupling body 2 while also being fixed by the retainer 6 within the coupling body 2. In the mounted state illustrated in FIGS. 4f and 4g, the retainer 6 is located between the upset 26 and the inlet opening 4 of the coupling body 2.

FIGS. 1 and 4g identify that there are contact protrusions 41 positioned on an inlet opening side surface 40 of the retainer 6 on each of the retainer legs 8 and the locking arms 9, which contact protrusions 41 are featuring an arched protrusion surface 42 on the side facing away from the throughbore 3. The protrusion surfaces 42 are located on a circular path according to the design example. If according to FIGS. 4f and 4g, a pressure is built up in mounted state within the coupling body 2, the male member 5 is pressed against the retainer 6, so that the retainer 6 is pressed against a retainer side surface of a neck 43 of the coupling body 2. The neck 43 is featuring non-illustrated recesses complementary to the contact protrusions 41, which the contact protrusions 41 are engaging in mounted state of the coupling when pressure is built up inside of the coupling body. According to the design example, the protrusion surfaces 42 are preferentially resting upon non-illustrated complementary protrusion surfaces of the neck 43 when the upset 26 and the retainer 6 are being pressed counter the direction of insertion 27 against the neck 43.

Figure 5A:
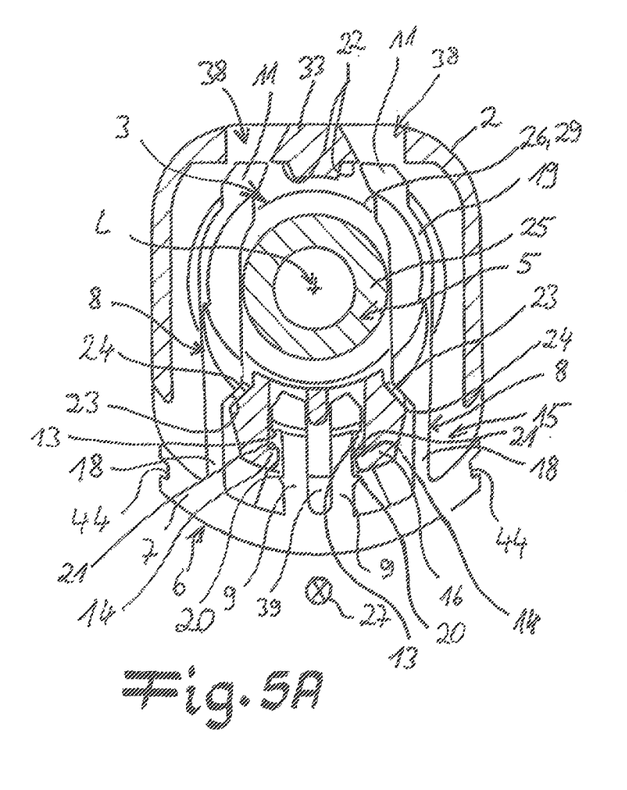
FIG. 5a is a top view of the coupling body according to the invention with male member, whereby the retainer is lifted off of the locking position
Figure 5B:
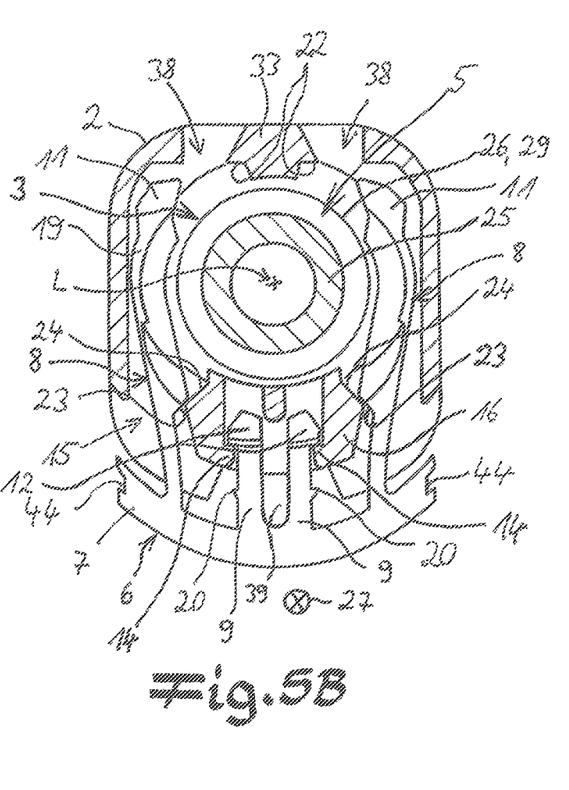
FIG. 5b is a top view of the coupling body according to the invention and FIG. 5a with male member fully inserted and the retainer in the release position.

In order to remove the male member 5 from the coupling body 2, the retainer 6 must be shifted from the locking position into the release position according to FIG. 4f, 4g. For this purpose, the crossbar 7 of the retainer 6 is equipped with manipulation elements molded as handle elements 44, with which the retainer 6 located in the crossbar receptacle 15 can be seized in the locking position and shifted from the coupling body 2 out of the locking position into the release position as illustrated in FIG. 5b in radial direction in relation to the throughbore 3. During this shifting, the free ends 11 of the retainer legs 8 are first being lifted out of the coupling body side receptacle slots 38 and the retainer leg side expansion surfaces 23 are brought to rest upon the expansion element side, complementary expansion surfaces 24. This is illustrated in FIG. 5a. According to FIG. 5a, the upset 26 of the male member 5 is preferentially positioned in the first locking section 34 of the retainer 6. Starting at the temporary locking position of the retainer 6 in the coupling body 2 as illustrated in FIG. 5a, the retainer 6 is being prevented from radially moving outward by the protrusions 13 of the locking arms 9 resting upon the lug protrusions 21 of the locking elements 14. In the release position illustrated in FIG. 5b, the retainer legs 8 are expanded in such a way that the male member 5 with the upset 26 can slide past the retainer legs 8 in the direction of the inlet opening 4 counter the direction of insertion 27 becoming removable from the coupling body 2 through the inlet opening 4. Once the tractive force pointing away from the throughbore 3 is no longer impacting the crossbar 7 or the retainer 6, respectively, the elastic energy stored in the spring sections 18 will cause a pressing together of the retainer legs 8, so that the retainer 6 is being conditionally shifted into the coupling body by the diagonal shape of the expansion surfaces 23 and complementary expansion surfaces, whereby the spring sections 18 become tension-free and the free ends 11 of the retainer legs 8 are brought to rest upon the blocking surfaces 22, which is illustrated in FIG. 3*d*.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The claims are to be construed to include alternative embodiments to the extent permitted by the prior art.

The invention claimed is:

1. A coupling, for a fluid line, comprising a coupling body and a retainer,
   wherein the coupling body includes a throughbore, extending from an inlet opening at a male member reception end, whereby the coupling body in a mounted state functionally receives a male member extending through the inlet opening into the throughbore,
   wherein the retainer includes a crossbar, with two spaced retainer legs, each having a free end, wherein at least one locking arm is attached to the crossbar, whereby the retainer is mounted to the coupling body in a moveable manner in a radial direction in relation to the throughbore,
   wherein in a starting position, when the male member is not fully inserted into the coupling body, one free end of a retainer leg is resting upon a coupling body side blocking surface of the coupling body, blocking the retainer from shifting into a locking position, whereby the crossbar in the starting position protrudes out of the coupling body,
   wherein at least a free end of one of the retainer legs is positioned in a receptacle slot of the coupling body when the male member is functionally received into the coupling body and the retainer is shifted into a locking position, wherein, in order to indicate the mounted state, the crossbar in the locking position is positioned in a crossbar receptacle of the coupling body, and
   wherein the locking arm includes a locking element, which locking element in the starting position interacts with a complementary locking element of the coupling body releasably securing the retainer within the coupling body,
   wherein the at least one locking arm is arranged between the retainer legs which, like the at least one locking arm, extend from the crossbar and protrude further into the coupling body than the at least one locking arm; and
   wherein the male member includes an enlarged upset, and the retainer legs each include a conical insertion area whereby an impact of the insertion areas with the upset of the male member causes an expansion of the retainer legs and shifting of the retainer from the starting position into a release position in a radial direction, whereby during the shifting of the retainer, the crossbar of the retainer is shifted away from the coupling body from the starting position into the release position.

2. The coupling according to claim 1, wherein the coupling body receptacle slots are dimensioned in such a way that a shifting of the retainer legs away from each other is delimited by the receptacle slots.

3. The coupling according to claim 1, further comprising at least one contact protrusion positioned on an inlet opening side surface of a retainer leg with a lateral protrusion area having an approximately parallel orientation to the direction of insertion of the male member, which lateral protrusion area in the locking position rests upon a complimentary protrusion area of the coupling body.

4. The coupling according to claim 1, wherein each of the free ends of the retainer legs in the starting position rest upon a blocking surface of the coupling body and that the free ends in the locking position are each positioned in a coupling body side receptacle slot.

5. The coupling according to claim 1, wherein the retainer legs each include at least one rear exit opening side locking section, which locking sections rest upon the upset of the male member in the locking position or in the mounted state.

6. The coupling according to claim 5, further comprising a first locking section and a second locking section, whereby each of the locking sections include a contact area in transverse orientation to the direction of insertion of the male member as well as a lateral surface with an essentially parallel orientation to the direction of insertion, whereby the lateral surfaces of the first locking sections are each located on a first circular path, which is different from a second circular path defined by the lateral surfaces of the second locking sections.

7. The coupling according to claim 1, wherein the retainer can only be shifted from the starting position into the locking position by an impact force of the crossbar directed towards the throughbore when the retainer is moved into the release position through impact of the retainer legs by the upset of the male member.

8. The coupling according to claim 1, wherein the retainer legs each include an expansion surface, which expansion surfaces in the starting position of the retainer rest upon complementary expansion surfaces on the coupling body and wherein the complementary expansion surfaces, beginning at a first end proximate to the throughbore, diverge toward a second end remote from the throughbore.

9. The coupling according to claim 8, wherein during a shifting of the retainer from the locking position into the release position, the expansion surfaces can be brought to rest upon the complementary expansion surfaces of the coupling body, and that by sliding the retainer side expansion surfaces and coupling body side expansion surfaces onto one another, an expansion force can be applied to the retainer legs, such that the retainer legs are being forced apart and an upset of the male member can be shifted through the retainer legs in the direction of the inlet opening.

10. The coupling according to claim 1, wherein two locking arms are attached to the crossbar, which locking arms are spaced from one another and positioned between the respective retainer legs, whereby one locking element is attached to each locking arm.

11. The coupling according to claim 10, wherein each locking arm includes a head section protruding into the throughbore, which head section carries the locking element and a contact surface, that the locking element rests on the complementary locking element of the coupling body in the release position of the retainer and that the contact surface in the locking position of the retainer rests upon the upset securing the male member redundantly to the retainer legs in the throughbore.

12. The coupling according to claim 1, wherein at least one locking element is aligned to at least one locking arm, with which the retainer in the locking position and/or original or release position, respectively, is lockable with the coupling body.

13. The coupling according to claim 1, wherein the crossbar includes at least one manipulation element, for shifting of the retainer by impact force onto the manipulation element from the locking position into the release position and/or from the release position into the locking position.

14. The coupling according to claim 1, wherein the male member is secured into the coupling body merely by the retainer in the locking position, and the retainer comprises an indicator for the functional receiving of the male member into the coupling body.

15. The coupling according to claim 14, wherein the cross bar of the retainer protrudes from the coupling body when the retainer is in the starting position and is essentially positioned in the crossbar receptacle when the retainer is in the mounted state.

* * * * *